R. BOWER.
Improvement in Buggy Top.
No. 123,611.
Patented Feb. 13, 1872.
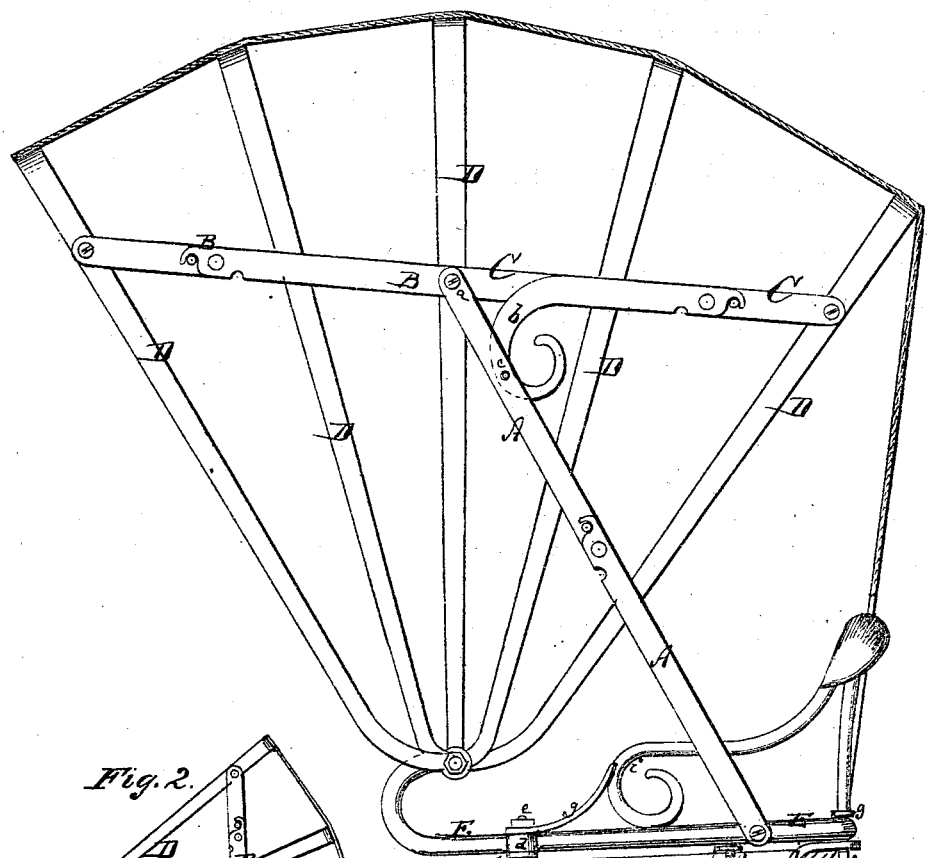
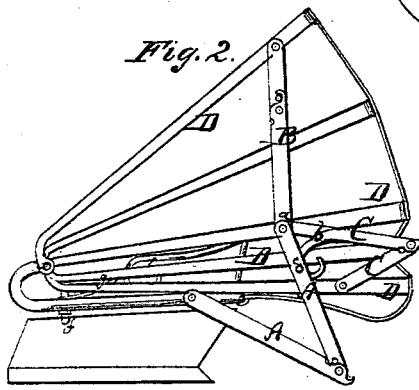
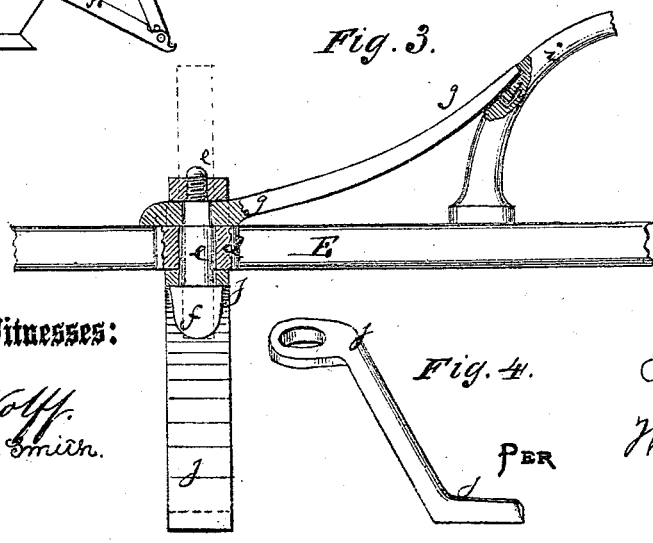
Witnesses:
E. Wolff.
Wm. H. C. Smith.
Inventor:
R. Bower.
Per
Attorneys.

123,611

UNITED STATES PATENT OFFICE.

ROBERT BOWER, OF LIMA, OHIO.

IMPROVEMENT IN BUGGY-TOPS.

Specification forming part of Letters Patent No. 123,611, dated February 13, 1872.

*To all whom it may concern:*

Be it known that I, ROBERT BOWER, of Lima, in the county of Allen and State of Ohio, have invented a new and useful Improvement in Buggy-Tops; and I do hereby declare that the following is a full, clear, and exact description thereof, which will enable others skilled in the art to make and use the same, reference being had to the accompanying drawing forming part of this specification, in which—

Figure 1 represents a side view, partly in section, of my improved buggy-top, showing it stretched. Fig. 2 is a side view of the same, showing it contracted. Fig. 3 is a sectional side view, on an enlarged scale, of the shifting rail. Fig. 4 is a detail perspective view of the seat-iron.

Similar letters of reference indicate corresponding parts.

This invention relates to a new extension-joint iron for carriage and buggy tops, and, also, to a new shifting-rail for the same. The extension joint has a projecting bracket by means of which it can be connected with the upright joint or disconnected at pleasure. The shifting-rail has an oval-headed bolt which connects it with the seat-iron and is locked by a spring-lever, by which it can also be turned to release the rail from the seat.

A in the drawing represents the upright brace of a carriage or buggy top. B is the forward brace of the same, and C the back extension joint, in line with B when the top is stretched, as in Fig. 1. The three said braces or joints are, by a common pivot, $a$, connected with one of the bows D D of the top. Each of the braces or joints consists of two jointed levers or sections in the ordinary manner. From the forward section of the back joint C extends a bracket, $b$, toward the upright joint; said bracket having a projecting pin, $c$, which can be sprung through an aperture in the upper section of the upright joint; the joints A and C are thereby united to extend or contract simultaneously. When, however, the pin $c$ is sprung out of the upright joint the back joint will be disengaged and the carriage-top can be swung back by contracting the joint A without contracting the joints B and C, but merely bringing the back bow upon the back of the seat. Each rail E of the top is, near its front end, provided with an eye, $d$, through which is fitted a bolt, $e$, having an oval head, $f$, at its lower end. The upper end of the bolt is squared and connected with a spring-handle or lever, $g$, which can, by a projecting pin, $h$, be locked to the arm-rest $i$ of the rail, so as to bring the long diameter of the head $f$ in line with the direction of the rail. The lower part of the bolt $e$ is fitted through a stationary seat-iron, $j$, which has an oval hole, whose long diameter is at right angles to the rail. The head $f$ can enter the seat-iron when the lever $g$ is swung at right angles to the rail. By then bringing said lever over the rail and locking it to the arm-rest, as in the drawing, the bolt-head will be turned so as to lock the top to the seat. This attachment permits the ready removal and replacement of the top.

Having thus described my invention, I claim as new and desire to secure by Letters Patent—

The back joint C provided with the bracket $b$ and pin $c$, whereby it can be connected with or detached from the upright joint A, substantially as herein shown and described.

ROBERT BOWER.

Witnesses:
F. M. ROBB,
THEO. D. ROBB.